(12) United States Patent
Vimalchand et al.

(10) Patent No.: US 8,852,303 B2
(45) Date of Patent: Oct. 7, 2014

(54) HIGH PRESSURE FEEDER AND METHOD OF OPERATING TO FEED GRANULAR OR FINE MATERIALS

(75) Inventors: Pannalal Vimalchand, Birmingham, AL (US); Guohai Liu, Birmingham, AL (US); Wan Wang Peng, Birmingham, AL (US)

(73) Assignee: Southern Company Services, Inc., Birmingham, AL (US)

( * ) Notice: Subject to any disclaimer, the term of this patent is extended or adjusted under 35 U.S.C. 154(b) by 929 days.

(21) Appl. No.: 12/970,006

(22) Filed: Dec. 16, 2010

(65) Prior Publication Data

US 2011/0146153 A1  Jun. 23, 2011

Related U.S. Application Data

(60) Provisional application No. 61/288,534, filed on Dec. 21, 2009.

(51) Int. Cl.
| | | |
|---|---|---|
| *B01J 7/00* | (2006.01) | |
| *F23K 3/02* | (2006.01) | |
| *C10J 3/50* | (2006.01) | |
| *C10J 3/30* | (2006.01) | |
| *C10J 3/72* | (2006.01) | |

(52) U.S. Cl.
CPC ... *C10J 3/30* (2013.01); *F23K 3/02* (2013.01); *C10J 3/50* (2013.01); *C10J 2200/156* (2013.01); *C10J 2200/09* (2013.01); *C10J 3/723* (2013.01); *C10J 2300/093* (2013.01)
USPC .......................................................... 48/61

(58) Field of Classification Search
CPC .... C10J 2200/156; C10J 3/50; C10J 2200/15; C10J 3/30; F23K 3/02
See application file for complete search history.

(56) References Cited

U.S. PATENT DOCUMENTS

| | | | |
|---|---|---|---|
| 3,393,944 A | | 7/1968 | Reintjes |
| 3,775,071 A | * | 11/1973 | Hoffert et al. .................. 48/210 |
| 4,089,429 A | * | 5/1978 | Stock et al. .................. 414/200 |
| 4,140,228 A | * | 2/1979 | Hathaway et al. ............ 414/200 |
| 4,384,536 A | | 5/1983 | Biswas |
| 5,560,550 A | | 10/1996 | Krawczyk |
| 2003/0221432 A1 | * | 12/2003 | Tucker ........................... 60/781 |
| 2007/0074643 A1 | | 4/2007 | Tietze |
| 2007/0297958 A1 | | 12/2007 | Sprouse et al. |
| 2010/0147413 A1 | * | 6/2010 | Schingnitz et al. ............... 141/4 |
| 2010/0280137 A1 | * | 11/2010 | Kukkonen et al. ............. 518/712 |
| 2011/0100274 A1 | * | 5/2011 | Kuske et al. ................... 110/347 |
| 2011/0233471 A1 | * | 9/2011 | Hamel et al. ................... 252/373 |

FOREIGN PATENT DOCUMENTS

| | | |
|---|---|---|
| EP | 0497088 | 8/1992 |
| JP | 2002-248373 | 9/2002 |
| KR | 10 2004 0018581 | 3/2004 |

OTHER PUBLICATIONS

European supplementary search report dated Jun. 19, 2013.
International Search Report as published for International Application No. PCT/US2010/061271, Dec. 21, 2009.

* cited by examiner

*Primary Examiner* — Imran Akram
(74) *Attorney, Agent, or Firm* — Thomas | Horstemeyer, LLP

(57) ABSTRACT

A coal feed system to feed pulverized low rank coals containing up to 25 wt % moisture to gasifiers operating up to 1000 psig pressure is described. The system includes gas distributor and collector gas permeable pipes imbedded in the lock vessel. Different methods of operation of the feed system are disclosed to minimize feed problems associated with bridging and packing of the pulverized coal. The method of maintaining the feed system and feeder device exit pressures using gas addition or extraction with the pressure control device is also described.

10 Claims, 7 Drawing Sheets

HIGH PRESSURE FEEDER AND METHOD OF OPERATING TO FEED GRANULAR OR FINE MATERIALS

CROSS REFERENCE TO RELATED APPLICATION

This application claims the benefit of U.S. Provisional Application No. 61/288,534, filed Dec. 21, 2009, which is hereby incorporated by reference.

STATEMENT REGARDING FEDERALLY SPONSORED RESEARCH OR DEVELOPMENT

This invention was made with Government support under Cooperative Agreement Number DE-FC21-90MC25140 awarded by the United States Department of Energy. The United States government has certain rights in the invention.

FILED OF INVENTION

This disclosure relates to a device and the method of operation to feed a mixed size of granular or fine materials to a high pressure vessel.

BACKGROUND

One difficulty in feeding granular or fine coal with moderate amounts of moisture into a high pressure gasifier includes devising a reliable way to increase the pressure of the coal stream from atmospheric pressure to the operating pressure while accurately metering the coal feed rate. Essentially, three methods have been practiced: slurry coal feed systems, dry powder feed systems with a lock vessel and rotating metering devices, and coal pumps.

For the slurry coal feeder, the slurry includes 32-40 wt % water added to the powder coal to make the coal slurry viscosity low enough for pumping into a high pressure gasifier. A fundamental issue with this approach is that the cost of drying the low rank coals to a nearly moisture-free condition is very high because the drying process can be quite lengthy. For example, U.S. Pat. No. 6,162,265 discusses drying and preparing a slurry with low rank coals. The process is quite complicated and increases the capital, operating and maintenance costs to a level where the gasification facility becomes economically unattractive. It is relatively easy to remove the surface moisture from the coal; however, the drying facility required to remove nearly all the moisture including inherent moisture from coal is quite large. After removing nearly all the moisture from the coal, water is added again to make the slurry. In addition to the high cost of drying the coal, the thermal efficiency of the gasification process will be low because the water added to slurry the nearly dry coal needs to be evaporated in the gasifier. Thus, in the combined process of coal drying and slurry feeding, the moisture in and with the coal undergoes evaporation twice. The energy required to evaporate the water in the gasifier increases the oxygen consumption as well as the associated capital and operating costs. If the coal is not dried before slurrying, then the amount of water that needs to be evaporated in the gasifier nearly doubles as the low rank coals contain significantly high levels of moisture, which can be in the range 30 to 45 percent by weight of the coal. The double duty moisture evaporation in the gasifier significantly lowers process efficiency and useful syngas yield and increases operational costs with high oxygen consumption and higher cooling duties to condense moisture from the syngas. Therefore, using the slurry method to feed low rank coals to a high pressure gasifier is economically unfeasible. This may be the fundamental reason why no known commercial practice exists.

Using a lock vessel, as has been operated in the prior art, to feed the granular coal and metering the coal with a rotating device such as an auger or a screw feeder encounters problems too. The lock vessel is a means to increase the pressure as the coal moves from the atmospheric pressure in the storage bin to the operating pressure in the feed vessels. The lock vessel method to increase the pressure is based on swinging the pressure between the atmospheric and operating pressures cyclically. The lock vessel has two valves: one connecting the atmospheric pressure storage bin from which coal is fed to the lock vessel and the other connecting to a coal feed vessel which receives coal from the lock vessel and is maintained at the operating pressure of the gasifier. In cyclic operation, when the lock vessel is ready to receive coal from the atmospheric vessel, the inlet valve opens. Once the coal reaches a predetermined level, the inlet valve closes. Then the lock vessel is pressurized using nitrogen or any other relatively inert gas such as $CO_2$. When the lock vessel pressure equals to the feed vessel pressure, the outlet valve opens. The coal in the lock vessel is supposed to flow into the feed vessel under gravity. And most times, it does. However, when the coal moisture increases to above 5%, finely ground coal particles tend to pack in the lock vessel when the lock vessel is pressurized. The packed coal in the lock vessel will not dislodge from the lock vessel into the pressurized feed vessel. The feed vessel will gradually empty out, eventually interrupting the coal feed to the gasifier. The loss of coal feed affects the gasifier operation because it has to be shut down and restarted, thereby increasing operational costs and causing a loss in production.

The metering devices are generally rotating devices that require an appropriate seal to prevent the coal fines from leaking to the atmosphere. It is difficult to develop a long lasting reliable seal mechanically for the high pressure differences that exist between the feeder and the atmosphere because of the presence of coal dust and constant rotation of the device. Further, the accuracy of the metering becomes difficult because of the changes in coal bulk density. Erosion of the rotating device and housing by the coal particles is a significant issue for certain types of coal feeders.

Using a coal pump to directly feed coal to a high pressure gasifier has been in development for many years; but, the device has not been developed sufficiently enough for commercial applications. The fundamental issue is the wide variance in the properties of the coal powder or granular material. As the pressure seals are designed for certain narrow range of coal particles, it is difficult to seal at high pressures all the time for naturally varying feed characteristics of ground coal. The ground coal properties vary due to variations in raw coal, variations in crushing and milling operations and segregation of coal particles during storage and conveying. Any interruption of feed or blowback of hot ignitable process gases and gasifier bed materials can be highly unsafe for the coal pump system.

SUMMARY

The present disclosure describes an apparatus and methods of operation to feed granular or fine low rank coals with high moisture content, which can be as high as 25%, to a gasifier with operating pressure in the range of about 5 to 1000 psig.

The present disclosure relates to a solids feed system that provides an apparatus and method of operation to feed prepared coal or carbonaceous materials to a high pressure vessel. The preferred coal moisture is in the range of about 1-25%. The coal particle size can be in the range of about 0-6 mm. It should be appreciated that there are various ways to define irregularly shaped particles. Generally, some coal particles can have a sphericity around 0.7-sphericity refers to diameter of an equivalent spherical volume. In the context of this disclosure, a 6 mm particle, for example, refers to particles that can pass through a 6 mm sieve screen. Normally, it is understood that this is the case (passing through a sieve screen) unless stated otherwise. Even though the feed system can handle many different solids, the system is described using coal as the solid particles to feed as coal is one of the most difficult materials to handle because of its heterogeneity and differing characteristics.

The processed coal is stored in a coal storage bin and is fed to the lock vessel whenever a cycle demand signal is received from the control system. The present disclosure provides two methods to ensure that the solids particles dislodge and fall out of the lock vessel and into the feed vessel as desired by the operational sequence.

The first method, according to the present disclosure, is termed as a micro-fluidization method. During operation of the lock vessel, the lock vessel may be pressurized directly to the feed vessel pressure at a predetermined pressurization profile and rate before the lock vessel exit valve opens to the feed vessel. If the solid particles pack in the lock vessel, the operation fails as the feed vessel does not receive additional solids and the solids feeding process is interrupted. In one embodiment of the present disclosure, if the system operating pressure is greater than 50 psia, the lock vessel is pressurized to a pressure 3-10% higher than the system operating pressure. The pressure is then reduced to the feed vessel operating pressure by venting the gas out of the lock vessel to the coal surge bin. The gas venting rate or the orifice in the venting line is designed to ensure the gas superficial velocity in the lock vessel is about twice the minimum fluidization velocity of the mean particles in the lock vessel.

To ensure that substantially all the materials in the lock vessel are fluidized during the micro-fluidization process, gas venting elements are installed in large lock vessels. The structure of these venting elements includes steel pipes with many holes drilled through the pipe wall and all the holes are covered with gas permeable material that is impermeable to solids. One of these materials is sintered metals. Other materials and arrangements are equally feasible.

Further, to aid the fluidization process, additional gas can be added to the lock vessel through a gas distribution membrane or through gas addition pipes inserted into the lock vessel. The added gas will travel to the vent pipes and in the process to fluidize the bed materials.

For solid particles that do not have the strong tendency to pack throughout the lock vessel, the particles may still tend to pack mainly at the bottom of the lock vessel near the solids exit. The particle packing can be broken down by over-pressurizing or under-pressurizing the lock vessel to about 2-15 pounds per square inch (psi) higher or lower than the operating pressure of the feed vessel. When the valve between the lock and feed vessels is opened, the pressure difference will cause rapid gas exchanges between the lock and feed vessels. As a result, the bridge or particle packing near the lock vessel bottom will be broken down.

Another objective of the present disclosure is to have a pressure control device in the downcomer below the feed vessel to maintain a constant pressure difference between the gasifier or reactor vessel and the solids exit at the feeder. The device allows the system to rapidly inject or extract gas out of the feed system, maintaining a desired constant feed system pressure.

The feed system has a feed device downstream of the pressure control device. The feed device consists of a downcomer, a short riser and aeration nozzles. The solid particles in the lower part of the riser flow as a moving, expanded bed. The control gas from the feed vessel and feed device flowing into the downcomer and through the riser keeps the bed expanded. One of the objectives of this disclosure is to control the solid particles feed rate by controlling the bed moving speed in the riser with the total control gas that flows through the feed device.

Another objective of the disclosure is to reduce or prevent transport gas from contacting solid particles in the feed vessel and the downcomer. The transport gas is added to the top of the riser and conveying line to ensure sufficient conveying velocity is maintained. This facilitates the use of small amount of inert control gas in the feed vessel with large amount of reactive transport gas in the conveying line, preventing any reactions between the transport gas and solid particles in the feed vessel.

Another objective of the current disclosure is solids feed rate control through a combination of both control gas to the feed system and feed system pressure. For a given characteristic of the solids, the control of the feed rate is based on the gas flow rate to the discharge section of the feeder and the gas flow rate to the feed vessel. For the constant feed rate operation, the gas feed to the feed vessel is slightly higher than the solids volumetric flow rate out of the feed vessel. If the characteristics of the solids changes during operation, mass flow rate of coal or solids to the gasifier or reactor can be maintained by maintaining a constant feed system pressure.

BRIEF DESCRIPTION OF THE DRAWINGS

Aspects of the present disclosure can be better understood by illustrations and will be described by reference to the following drawings.

DETAILED DESCRIPTION

Figure 1:
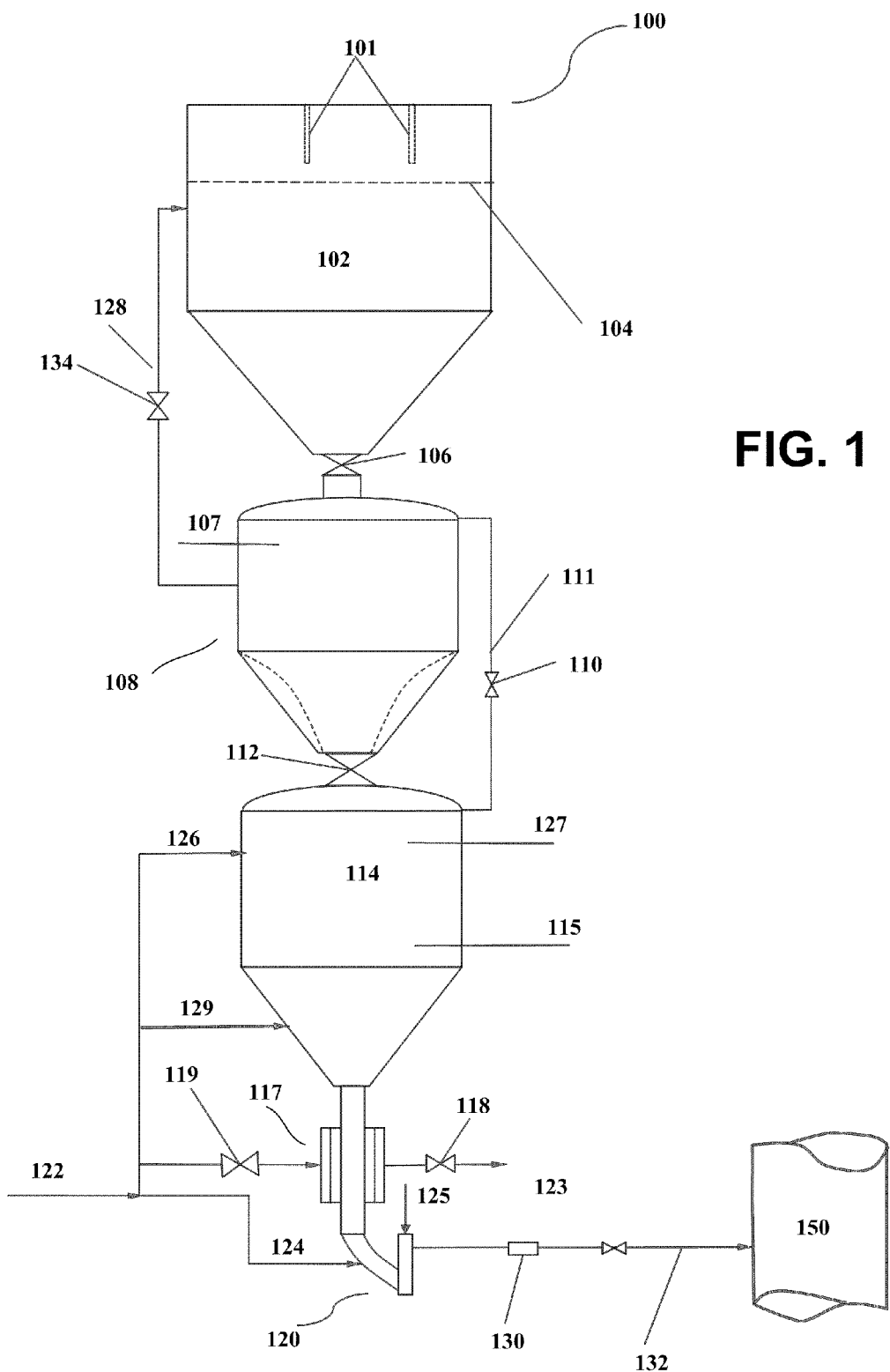
FIG. 1 is a schematic of a feeder assembly including a feed storage bin, a lock vessel, a feed vessel, a pressure control device and a feeder device in accordance with various embodiments of the present disclosure.

As shown in FIG. 1, a pressure decoupled advanced coal feeder (PDAC) 100 according to one embodiment of the disclosure, comprises an assembly of vessels and feed and pressure control devices. It includes a coal surge bin 102, configured to temporarily store processed coal in transit from a coal preparation system to a gasifier or reactor 150. The coal surge bin 102 also accepts vent gas from a lock vessel 108. A plurality of filter bags 101 are installed in the surge bin 102 to filter out coal dust. Also, a screen 104 with an opening is installed to prevent failed bags that fall from interrupting the coal feeding process. In some embodiments, the openings of the screen 104 can be sized in the range of about two by about two inches. Also included are a feed vessel 114, a pressure control device 117, a coal feed rate control device 120 and a coal density measurement instrument 130 on the coal conveying line 132 that conveys coal to the gasifier or reactor 150.

At least one valve 106 is installed between the lock vessel 108 and the surge bin 102. In many embodiments, two valves can be employed between the lock vessel 108 and surge bin 102. The first valve below the surge bin 102 isolates the surge bin from the lock vessel 108 when the feeder system goes through an outage. The second valve can be located between the lock vessel 108 and the first valve below the surge bin 102 and acts as a pressure boundary between the lock vessel and the surge bin. The second valve closes in a relatively clean environment as it is timed to close at least a few seconds after the first valve closes.

The valve 106 can open on demand and coal from the surge bin 102 fills the lock vessel 108 to a desired level. An initiation signal for adding coal to the lock vessel 108 can be a sequential action signal. The initiation signal can be based at least upon a coal level measurement in the coal feed vessel 114. For illustration purposes, one can use a level probe 115 as a starting point for the cycle of coal transfer. When the level probe 115 has detected that the coal level has reached a preset level, a sequence starts with the opening of the lock vessel inlet valve 106 to fill the lock vessel 108 to a pre-determined level 107. The level measurement for the lock vessel 108 can be any of the various level measurement techniques, such as gamma ray measurement, a conductance level probe, a capacitance level probe, a vibratory probe, ultrasonic level measurement, and other level measurement techniques. Once the level measurement has detected the solids level, the lock vessel solids inlet valve 106 is closed and the lock vessel 108 starts the pressurization process. In prior art processes, the lock vessel 108 is pressurized to a pressure equal to the feed vessel pressure and the valve 110 on the balance line 111 will open. At substantially the same time, the valve 112 at the outlet of the lock vessel 108 can open. The solids can flow out the lock vessel 108 by gravity into the feed vessel 114. However, when the solids such as coal in the lock vessel 108 contain a substantial amount of particles less than, for example, 45 microns in size, as well as particles having a relatively high moisture content, the particles may tend to pack and cannot flow freely under gravity. Solid particles such as coal, when dried and pulverized, may not be uniform in size and moisture characteristics may change over a period of time as short as a day. When size and moisture characteristics are out of bounds even for short duration during the day, it can lead to loss of coal feed to pressurized units such as a gasifier or reactor 150. By one of the following three methods, embodiments of the disclosure can maintain feed even if characteristics of feed particles vary.

In one embodiment, the lock vessel 108 can be over-pressurized about 3-15 psi higher than the pressure in the feed vessel. In different lock vessel operational methods described herein, the pressurization sequence includes a slow pressurization rate (e.g., for up to about 60 seconds), followed by a fast pressurization rate until the pressure is within 5% of the desired final pressure, and finally a slow pressurization rate until the desired final pressure is reached. The timing of each pressurization step can change depending on the characteristics of the coal source. Packing of the particles may occur at the start of pressurization and the initial slow pressurization step is helpful to minimize the effects of packing. The final slow pressurization step can ensure that the desired pressure is reached with minimum overshoot.

When the higher preset pressure of the lock vessel 108 has been reached, the valve 110 on balance line 111 can open first because the pressure is higher in the lock vessel 108 than in the feed vessel 114, and gas will flow from the lock vessel 108 to the feed vessel 114. The gas release from the lock vessel 108 may have a tendency to fluidize the solids in the lock vessel or break any minor bridging in the lock vessel 108. After a short time delay (e.g., between about 500 milliseconds to about 1 second), the lock vessel exit valve 112 can be opened. As the lock vessel 108 is still slightly under positive pressure, the minor bridging of the solids in the lock vessel exit can break and fall under gravity as well as with a push from the positive pressure in the lock vessel 108. By minor bridging, it is understood that the solids will normally flow and occasionally, (e.g., about every four to eight hours or about 30-60 cycles), there occurs a weak lock vessel bridging at the exit during which the solids fail to fall into the feed vessel 114. Whenever such a bridging occurs, the above procedure will break the bridge and the feed process will continue. This operation method is termed as an over-pressurization mode.

To maintain the pressure difference between the PDAC feeder device exit 123 and the reactor 150 substantially constant, the additional gas from over-pressurization that causes the higher pressure in the feed vessel 114 and coal feeder exit must be properly released. In one embodiment, in the present disclosure, the gas release is accomplished by a pressure control device. US Patent Publication No. 2010/0263342, which is incorporated herein by reference, describes a pressure control device (known therein as a pressure let-down device) and operating such a device in a different application where the device facilitates let-down of the solid streams pressure from an operating system pressure to substantially atmospheric pressure.

Figure 2:
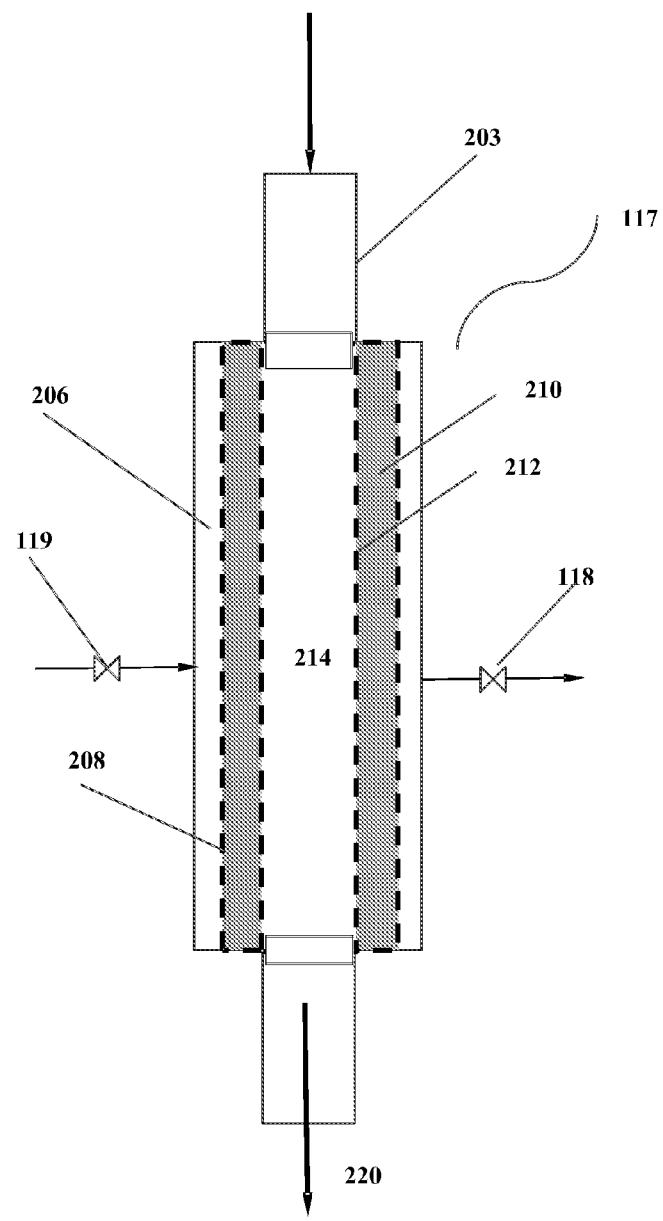
FIG. 2 is a schematic of the pressure control device of FIG. 1 in accordance with various embodiments of the present disclosure.

In the embodiment, a pressure control device 117 is presented in FIG. 2 for coal feeder application, where the pressure control device is reconfigured for use as a means to add gas through valve 119 to the solids stream 214. The gas chamber 206 is isolated from the process solids stream 214 with a bed of inert granular solids 210 held in place with an inner gas permeable membrane 212 and an outer gas permeable membrane 208. Gas can also be extracted through valve 118 to reduce solids stream 214 pressure. Unlike the device used in US2010/0263342, where the exit pressure of the solid stream is generally less than half of inlet pressure, in this embodiment the pressure difference across the pressure control device 117 is low, as the purpose is to control pressure by adding or venting gas in small amounts. With addition/extraction of gas from solids stream 214, the pressure of the solids stream at the exit 220 of the pressure control device 117 can be maintained substantially constant.

As the lock vessel 108 is operated in the over-pressurization mode, when the valve 110 in the pressure balance line 111 and the valve 112 are open, the gas together with the solids can travel out of the feed vessel 114 faster due to a higher pressure difference created due to over-pressurization. If the gas and solids are allowed to flow from the feed vessel 114 to the reactor 150, the pressure difference between the PDAC feeder device exit 123 and the reactor 150 may increase and as a result, the solids feed rate will also increase. As shown below, control of the pressure difference is critical to control the flow rate of the solids from the PDAC feeder device exit 123 to the reactor 150. To avoid such a pressure increase, the excess gas due to over-pressurization of the lock vessel 108 can be released by the pressure control device 117 by opening the gas release valve 118.

The pressure control device 117 as shown in FIG. 2 can be located in the downcomer, downstream of the feed vessel 114, and receives gas and solids flow stream 214 from the lock vessel 108. The connecting pipe 203 and the pressure control device 117 are in communication with the feeder vessel 114 at a first end and the PDAC feeder device 120 at an opposing end. When a pressure measurement device 127 detects a pressure that is higher than the preset value, the control valve 118 will open to rapidly reduce, if necessary, the feed vessel 114 pressure to the preset value. The gas and solids stream at the exit 220 of the pressure control device 117 is nearly at constant pressure. Note that a brief high coal feed rate spike is nearly harmless for the coal gasifier's performance and operation. Therefore, for the over-pressurization mode, the gas releases to reduce the feed vessel pressure need not be drastic and can be easily controlled. Operating the lock vessel 108 and the system under the over-pressurization mode can be advantageous because the logic of the system reduces any possibility of the gas reverse flow from the reactor 150 to the feeder which, if it occurs, is a safety concern. Under the over-pressurization mode, the worst scenario is a spike in the coal feed rate due to any potential inaccuracy in pressure control. Normally, the pressure control can function reliably and precisely and the coal feed rate will not show any spikes.

A second operation mode for the lock vessel is termed under-pressurization mode. This mode can function when the packing that occurs in the lock vessel is due to the fines fraction in the coal that is higher than normal. Under this operating mode, the lock vessel 108 is pressurized to a slightly lower pressure than in the feed vessel 114. Depending on the characteristics of the coal, the pressure differential can be in the range 3 to 15 psi. When the pressure in the lock vessel 108 reaches the preset pressure, which can be about 3 to 15 psi below the feed vessel pressure, the valve 112 can be configured to open. The higher pressure in the feed vessel 114 will force the gas from the feed vessel to flow upward into the lock vessel 108. After valve 112 opens, the valve 110 in the balance line can also be configured to open after a short delay. As the coal starts to fall from lock to feed vessel, the space occupied by coal should be filled by a gas. As the coal falls into the feed vessel, an equivalent amount of gas is displaced. The gas displaced from the feed vessel can go through the balance line to lock vessel to occupy the volume of coal that moved to feed vessel.

In the under-pressurization mode, even a small pressure difference can cause the gas from the feed vessel 114 to rush to the lock vessel 108 at high velocities. This exerts sufficient force from bottom and breaks any bridge that typically forms at the lock vessel exit. The rushing velocity can be as high as 120 ft/s even at a low 2 psi pressure difference at 250 psig operating pressure. Also, a part of the additional gas injected will also rush into the lock vessel 108, fluidizing the materials in the lock vessel 108 and minimizing the effect of packing.

The under-pressurization can cause a substantially instantaneous pressure reduction in the feeder system which, in turn, can cause a feed rate reduction if no further action is taken. But, a reverse flow situation is unlikely because the normal operating feeder pressure is designed to be at least 15 psi higher than the reactor pressure. In practice, the pressure differential during normal operation can be 50 psi. However, feed rate reduction from the feed system in supplying coal to the gasifier is undesirable. To avoid the feed rate reduction, gas is injected into the feeder system through the feed line 122 to upper (stream 126) and lower (stream 129) portions of the feed vessel 114, the pressure control device 117 using valve 119 and the PDAC feed device 120 with stream 124. The distribution of the gas between these streams is dependent on the characteristics of feed material and system design. It is understood that the number of nozzles in the feed vessel 114 and PDAC feed device 120 can be multiple. The amount of additional gas necessary for a given lock vessel size and the extent of under-pressurization can be calculated quite precisely. For example, if the lock vessel volume is 500 ft$^3$ with 50% of the volume occupied by the gas phase and the lock vessel 108 is 15 psi under pressurized, then the total amount of additional gas necessary is 17.5 lbs. With a known amount of additional gas needed and the desired time interval to restore the pressure in the feed vessel, people skilled in the art can size a buffer tank or select appropriate line sizes and control valves to inject the gas. To minimize the time lag and considering the actuation time for the valves, a feed forward control system can be used and a signal issued to the gas injection valves to ensure the pressure restoration time is less than about 500 milliseconds.

Another embodiment of the disclosure is termed micro-fluidization. The lock vessel 108 can be pressurized about 3-15% higher than the pressure in the feed vessel 114. The high pressure gas is then released from the lock vessel 108 through valve 134 in vent line 128 until the pressure in the lock vessel 108 is essentially the same as the feed vessel 114. If gas is released uniformly throughout the solids bed in the lock vessel 108 and the gas superficial velocity in the lock vessel 108 is substantially higher than the minimum fluidization velocity of the particles, then the solids bed in the lock vessel 108 will be fluidized. This minimizes the effects of particle packing in the lock vessel 108 and the solids will free fall into the feed vessel 114 when the valve 112 shown in FIG. 1 opens.

For most solids, the particle packing effects in the lock vessel 108 are reduced during later stages of the fast pressurization step. A variation of micro-fluidization can be effected by venting gas in the time range of about 1 to 3 seconds during the fast pressurization step and then continuing to pressurize to feed vessel pressure before opening the balance line valve 110 and the valve 112 between the lock vessel 108 and feed vessel 114. This variation is helpful as much of the particle packing occurring during the initial pressurization stage can be dislodged and solids aerated. Solids have fewer tendencies to pack with continued pressurization after the micro-fluidization step.

One aspect of micro-fluidization includes releasing the high pressure gas from the lock vessel 108 as uniformly as possible. The method can be best illustrated with the lock vessel 108 depicted in FIG. 3. To release gas substantially uniformly throughout the lock vessel 108, gas release elements can be installed inside the lock vessel 108. The gas release elements 310 and 320 are similar in structure and are further illustrated in FIG. 4. The gas release elements 310 and 320 comprise a ring header 410 for collection as well as for distribution of the pressurizing gas as necessary. A plurality of gas permeable pipes 412 are mounted onto the ring header 410; the length of the pipes 412 can vary depending upon the shape of the lock vessel 108.

Figure 4:
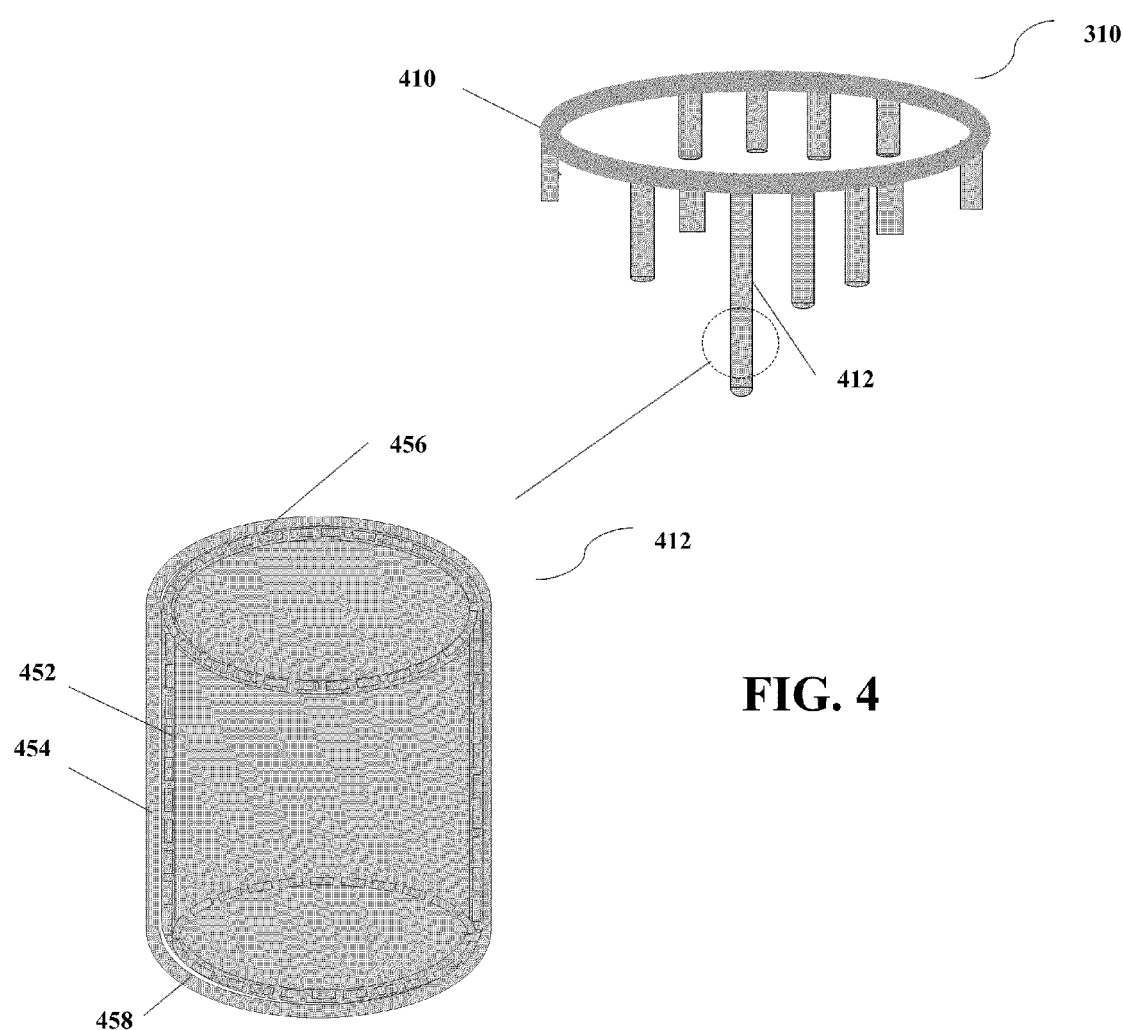
FIG. 4 is a schematic of a lock vessel gas injection and release device in accordance with various embodiments of the present disclosure.

FIG. 4 illustrates the structure of the gas permeable pipe 412. The inner part 452 is a pipe with a plurality of holes drilled through its wall. The size of each hole can vary, but in one embodiment, they can be sized from about ¼ inch to about ½ inch. The number of holes depends at least upon the pipe size and the amount of gas to be released. One guideline is that the total cross-sectional area of the holes can be at least 10 times the cross-sectional area of the pipe 412 based on the pipe diameter so that the holes will not provide any substantial resistance to the gas flow. The outer member 454 of the gas permeable pipe 412 can be made of any gas permeable material. However, as discussed below, the pipe 412 can be used for gas to flow both ways. Therefore, in one embodiment, the pipe 412 can be rigid. The most common material that fits this application is sintered metals which are available in various pore sizes. The sintered metal can restrict particles from entering the inner pipe and erode the venting valves.

When the lock vessel 108 operates in a micro-fluidization mode, the gas release pipe 412 can also be used during pressurization to distribute the pressurizing gas 302 for materials that have low permeabilities. When these internals are used for the gas distribution, they can distribute the gas quicker and more uniformly throughout the solids bed overcoming flow restrictions due to low permeabilities. The uniform distribution of the gas throughout the solids bed in the lock vessel 108 is a challenge for those solid particles with poor permeability. Some practitioners promote a slow pressurization technique so that the gas can penetrate throughout the bed during the pressurization stage. However, often times for commercial operation, this technique becomes impractical as it requires long pressurization times. The internal arrangement embodiments of the lock vessel 108 presented in FIGS. 3-5 render a much shorter gas flow path in the bed compared to the use of a conical membrane and/or nozzles on a side of the lock vessel 108 as the pressurization means. During the pressurization stage, a hyperbolic membrane 330 located in the cone section of the lock vessel 108 (as illustrated in FIG. 3) can also be used to add gas 302.

In one embodiment, one guideline for micro-fluidization is that the pressure in the lock vessel 108 should be about 3-15% higher than the feed vessel pressure depending on the operating pressure, the size of the lock vessel 108 and characteristics of the feed material. The percent of over-pressurization in the lock vessel 108 is lower with the increased operating pressure and with the increased size of the lock vessel 108. After the lock vessel 108 has reached the preset over-pressure for micro-fluidization, the pressure release rate through the internal gas release elements 310 and 320 as well as the normal venting line 128 can be such that the gas velocity in the lock vessel 108 is larger than two times the minimum fluidization velocity to facilitate fluidization of substantially all materials in the lock vessel 108, reducing the effect of the particle packing. In one non-limiting example, if the feed vessel is pressurized at about 500 psi and a 10% over pressure is chosen before the vent valves are open, then the 'preset' overpressure is 550 (500+10% of 500) psi.

Figure 3:
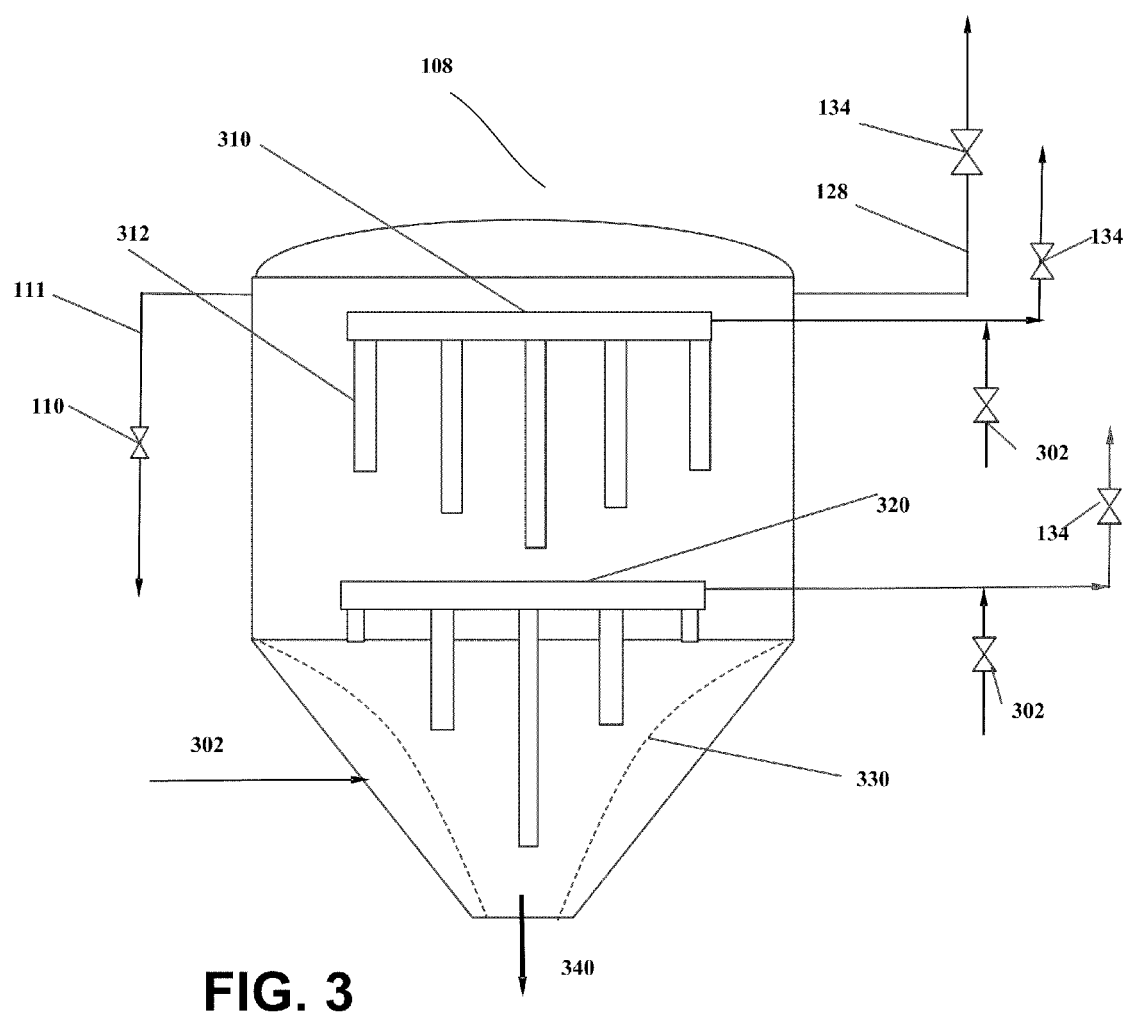
FIG. 3 is a schematic of the lock vessel of FIG. 1 with internal gas distribution and venting arrangements in accordance with various embodiments of the present disclosure.

To ensure the coal in the lock vessel 108 is fluidized during the gas release stage for materials prone to packing, gas stream 302 (as indicated by FIG. 3) can be injected for a few seconds through the membrane 330 in the cone section of the lock vessel 108. Since the cone and exit sections of the lock vessel 108 are most likely to be packed, the gas injection during the gas release can aid the solids to be fluidized in these sections and thus reduce the effects of particle packing and bridging that may occur during pressurization. After the over-pressurized gas is released and the lock vessel pressure equals the feed vessel pressure, the solids can freely fall into the feed vessel 114. The gas release operation during micro-fluidization can, in one embodiment, last between about 1 to about 5 seconds depending upon the operating pressure.

Figure 5:
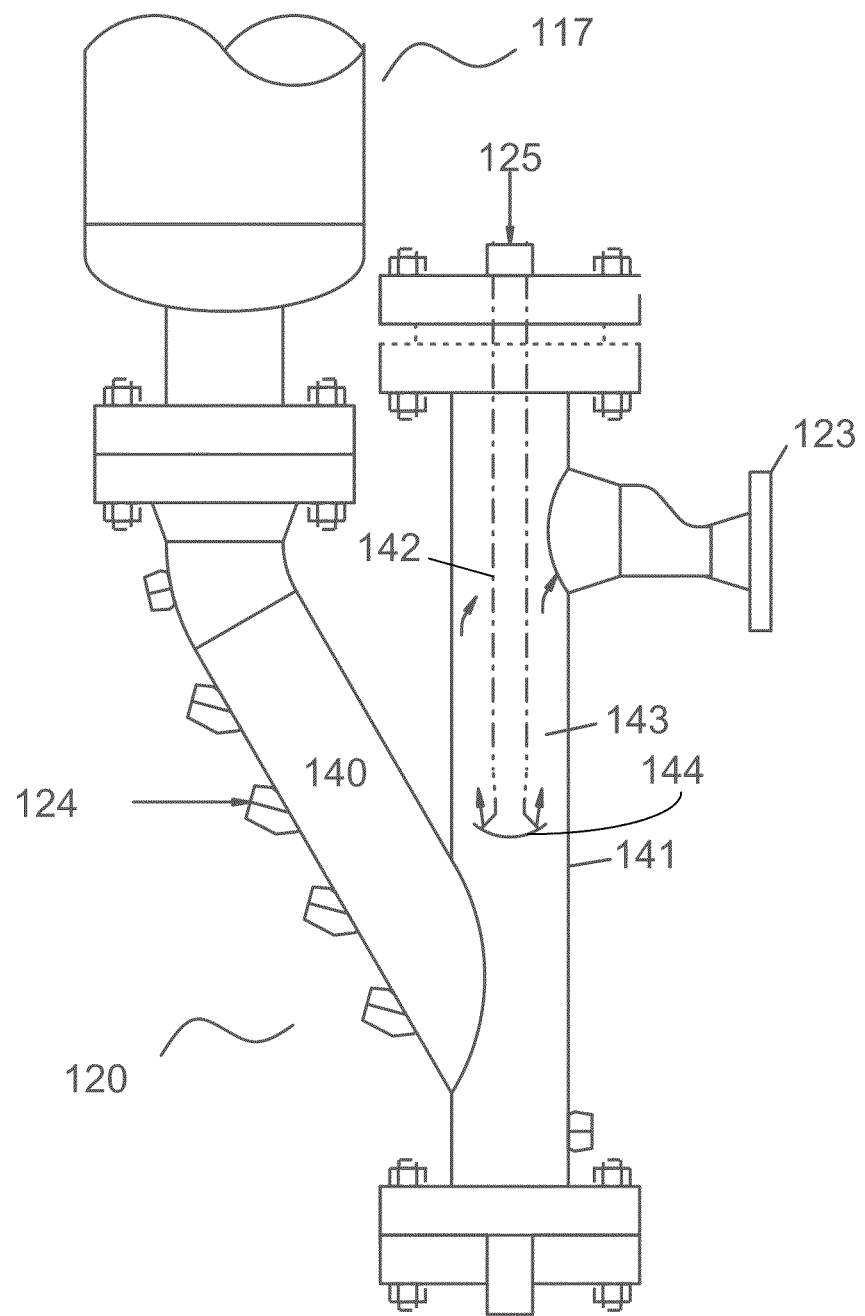
FIG. 5 is a schematic of the feeder device of FIG. 1 in accordance with various embodiments of the present disclosure.

As has been mentioned above, the pressure control device 117 can be used to control the pressure difference between the feeder and the reactor 150 either by withdrawing the gas or by adding the gas to the solids stream 214 flowing through the device 117. The second method used to maintain the pressure difference between the coal feeder and the gasifier or reactor 150 is the PDAC feeder device 120 as shown in FIG. 5. The control gas added through the feed vessel 114 and pressure control device 117 flows through the PDAC feeder device 120. Additional control gas 124 is added as necessary to control the coal feed rate through the device 120.

The coal feed rate is controlled through a combination of both control gas to the feed system that passes through the PDAC feeder device 120 and feed system pressure. For a given characteristic of the solids, the control of the feed rate is based at least upon the gas flow rate to the discharge section of the feeder and the gas flow rate to the feed vessel and the pressure control device 117. For the constant feed rate operation, the gas feed to the feed vessel 114 is slightly higher than the solids volumetric flow rate out of the feed vessel 114. A part of the gas entering the feed vessel 114 occupies the volume displaced as solids are continuously fed out of the vessel 114. If the characteristics of the solids changes during operation due to changes in grind or segregation in surge bin 102, the mass flow rate of coal or solids to the gasifier or reactor 150 can be maintained by maintaining a substantially constant feed system pressure.

As shown in FIG. 5, the coal from the pressure control device 117 moves down a short inclined downcomer section of the pipe 140. The coal then moves through a short vertical riser 141 before being discharged to the conveying line through feeder exit 123. A part of the conveying gas 125 enters the top of the riser through pipe 142 and exits into the riser 141 through an inverted cone 144 coupled to the end of pipe 142. The conveying gas as it leaves the inverted cone 144 picks-up coal particles from the top of the moving expanded bed to convey the coal to the downstream unit. Both the control gas and conveying gas can flow upward through section 143. Depending upon the characteristics of feed material and downstream process, the superficial gas velocity in section 143 of the riser 141 can be maintained between about 3 and 10 ft/s by adjusting the conveying gas flow rate. Additional conveying gas is added downstream of the feeder device exit 123 to maintain a superficial gas velocity in the line to convey coal to the gasifier or reactor 150. Even though one configuration of feed rate control device 117 is shown in FIG. 5, a person skilled in the art of handling solids should appreciate other configurations involving changes to the way conveying gas is introduced into the riser and the way the coal is conveyed out of the riser that are consistent with this disclosure.

The size of the inclined leg in downcomer section 140 and riser 141 are chosen to achieve turndown and control over coal feed rate. The inclined leg is aerated by a small portion of the control gas and the coal flows through the inclined leg essentially by gravity. The diameter of the inclined leg is chosen to provide more than the maximum coal feed rate that the device is designed for in order to ensure that the feed to the riser bottom is not limited at the maximum coal feed rate through the riser. Much of the control gas added to various locations in the feed system can enter the riser 141. The characteristics of gas and solids in the riser 141 can be described as a moving dense expanded bed. The coal feed rate is proportional to the superficial gas velocity or the volumetric gas flow rate due to the control gas that eventually flows through the riser 141. The superficial gas velocity in this portion of the riser can be between about 0 and about 1 ft/s. The control gas can range between about 10 to 15% of the total conveying gas.

The conveying gas 125 may be different from the control gas 124 added to various locations in the PDAC feed system. Due to reactivity concerns, there may be situations where it is not desirable to have conveying gas enter the feed vessel 114, which can contain bulk amounts of the feed material. In air blown gasification, the conveying gas is air and the control gas is typically an inert gas such as nitrogen or carbon dioxide. The PDAC feed device embodiment shown in FIG. 5 effectively prevents air from entering the feed vessel 114 and reacting with coal.

The apparatus and methods presented increases the feed system's reliability to maintain coal feed rate to the gasifier even with difficult to handle coals as well as with varying coal characteristics and preparation methods. The system's reliability is further increased as the feed device embodiment in FIG. 5 has no moving parts, which are norm in other types of coal feeders. Rotary table feeders, auger feeders, piston feeders and rotating dry pump feeders are examples of other types of coal feeders that have moving parts that can be prone to wear and tear and other maintenance problems such as motors, shaft seal leakage, maintaining small clearances (e.g., 5 mil) between stationary and rotating parts, blow through and erosion issues.

EXAMPLE

Described below is one non-limiting example of an embodiment of the disclosure. None of the descriptions, ranges, or other information in this example should be considered to limit the scope of the present disclosure. In a fast circulating, pressurized fluidized bed gasification pilot test facility, an auger and rotary table feeder systems were tested and poor availability of these systems and other inherent scalability issues led to the development of the PDAC feeder system. The PDAC feeder system can be directly lined-up to the gasifier for on-line gasification operation or can be connected to a closed-circuit Off-line Coal Feed Test System. The Off-line system, which included a large receiver pressure vessel simulating the gasifier and a pressure let-down system, allowed us to operate substantially continuously in closed-loop and test various concepts rigorously. When on-line to the gasifier, the feeder system can feed from about 300 to 6000 lbs per hour of coal at about 100 to 280 psig pressure; while in off-line test loop, the feeder system can feed similar rates up to about 480 psig pressure. For test purposes, the mass mean diameter of the coal was varied from about 200 to 800 microns. Low rank coals were predominantly tested and the moisture content of the feed coal varied from about 18 to 25 wt %.

During pressurization, tendency for coal particles to pack causes coal bridging in the lock vessel, which may negatively affect feed system performance and availability. In pilot test facility, originally, the traditional pressurization mode (equal-pressurization) was used for operation and that led to a number of outages. Lock vessel at the pilot test facility has been designed and operated in various modes described earlier: slow pressurization, under-pressurization, over-pressurization and micro-fluidization. Variety of operation modes were designed either to minimize bridging and packing potential or to break the bridging and packing once detected without losing feed to the gasifier.

Figure 6:
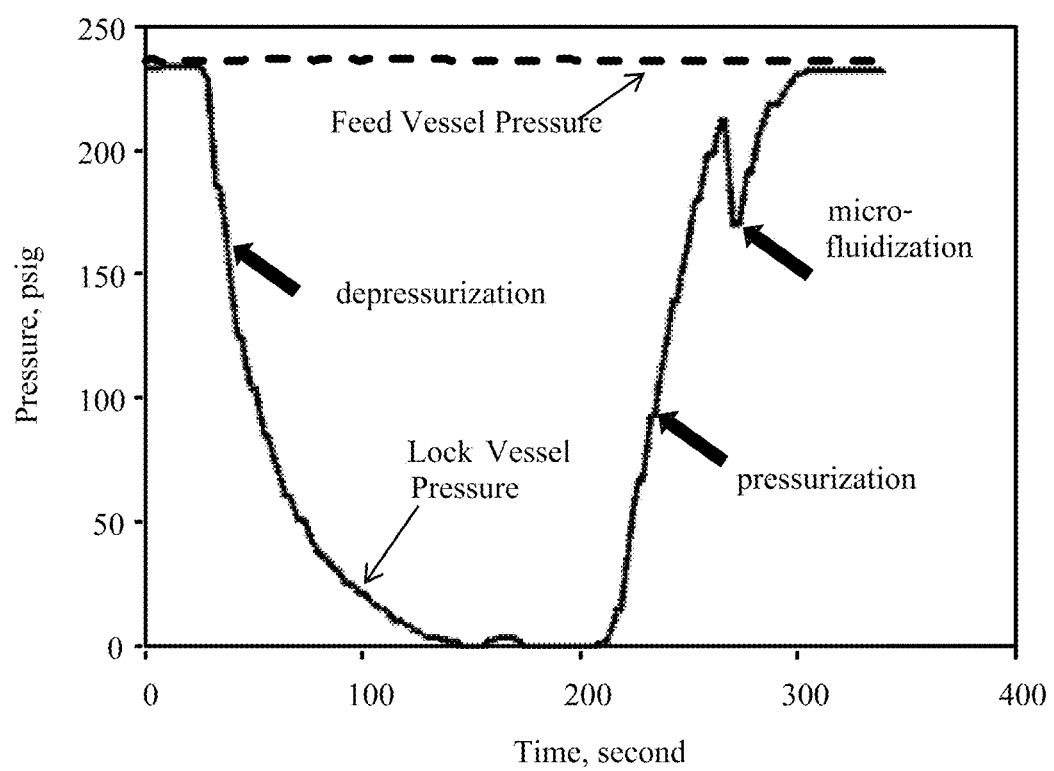
FIG. 6 is an experimental trend of lock and feed vessel pressures illustrating micro-fluidization.

As the lock vessel at the pilot test facility was small, no internals as described earlier was necessary and the micro-fluidization was practiced during pressurization before the pressure reached the feed vessel pressure (FIG. 6). Also, for test purposes, in the over-pressurization mode, the valve between the lock and feed vessels was opened first and after a short time delay (1 to 5 seconds), the valve on the balance line was opened. As the internal surface of the lock vessel had a smooth finish, reducing the wall friction, the intentional pressure difference for a short duration after opening the valve between the lock and feed vessel was helpful at times in assisting the solids to move to the feed vessel. A form of internal pipes with gas manifold discussed in reference to FIG. 4 was tested. These pipes were located near the wall of the vessel and the ½ inch holes on one side of the pipe with sintered metal covering were facing the wall. After opening the valve between the lock and feed vessels, nitrogen was pulsed through the manifold and pipes to dislodge moderate packing on the side of the vessel. After experimenting with various means invented, the lock vessel operated trouble-free with a number of different coals, coal characteristics, grind sizes and moisture content.

Figure 7:
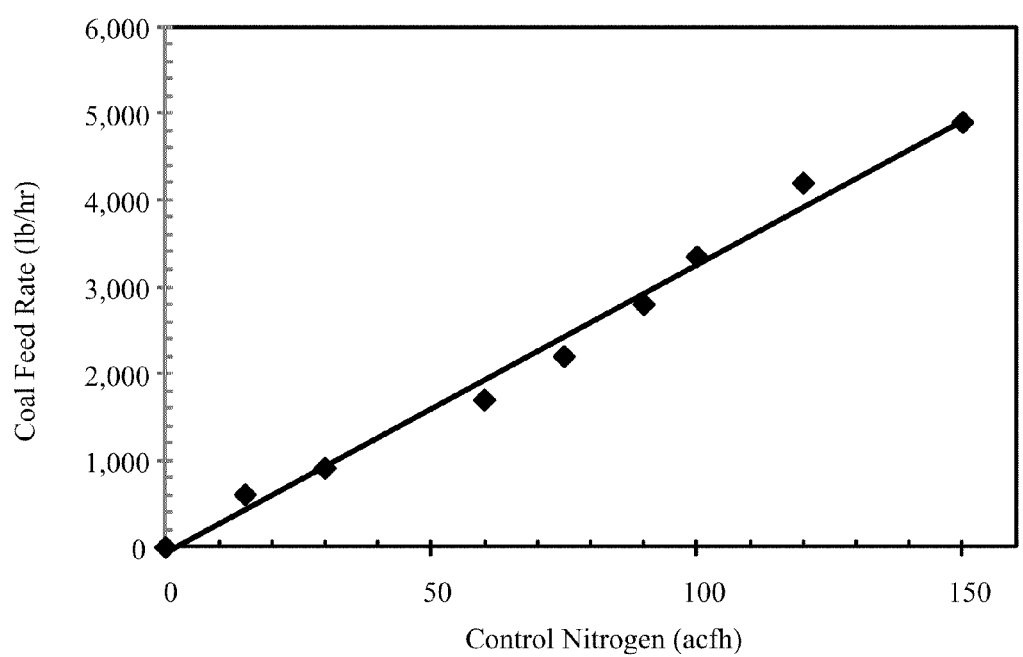
FIG. 7 is an experimental trend of coal feed rate versus total Control nitrogen flow rate through the PDAC feeder device.

At the test facility, the pressure control device is coupled with the PDAC feeder device to control and regulate the coal feed rate. During operation transitions such as start-up, ramp-up, ramp-down and gasifier trips, the pressure control device aeration or vent were used to quickly stabilize the PDAC system and the feed rate to new conditions. In normal operation, control (gas) nitrogen flow was used to control the coal feed rate. As shown in FIG. 7, the PDAC feed system was designed to maintain proportionality between coal feed rate and control nitrogen flow rate in the desired operations range. The test facility also had a Trim control nitrogen flow to feeder device to slightly vary coal feed rate to address fluctuations inherent in the gasifier. Both the pressure control device and the PDAC feeder device were maintenance-free and 100% available in over 3,500 hours of testing.

What is claimed is:

1. A coal feeder system, comprising:
a coal surge bin configured to store processed coal for feeding into a gasifier;
a lock vessel coupled to the coal surge bin, the lock vessel being a pressure swing device;
a gas collector and distributor disposed within the lock vessel, the gas collector and distributor configured to distribute gas within the lock vessel;
a gas permeable membrane disposed within a conical section of the lock vessel;
a feed vessel coupled to the lock vessel, the feed vessel configured to operate at a substantially constant pressure;
a pressure control device programmed to maintain a substantially constant pressure between the feed vessel and a gasifier; and
a feeder device configured to control a coal feed rate into the gasifier.

2. The coal feeder system of claim 1, wherein the coal surge bin is configured for temporary storage of processed coal, the processed coal comprising up to about twenty-five percent moisture by weight.

3. The coal feeder system of claim 1, wherein the lock vessel further comprises internals configured to release an entrained gas substantially uniformly throughout the lock vessel and fluidize bed materials in the lock vessel.

4. The coal feeder system of claim 3, wherein the internals further comprise a network of gas permeable pipes comprising sintered metals and connected to a manifold, and wherein gas collected in the manifold is vented to the surge bin.

5. The coal feeder system of claim 1, wherein the pressure control device further comprises means to add or extract gas from a solids stream passing through the coal feeder system to maintain a substantially constant downstream pressure.

6. The coal feeder system of claim 1, wherein a bridged material in at least one of the conical section and an exit section of the lock vessel and a packed material adjacent to the walls of the lock vessel are dispersed, allowing pulverized material to flow from the lock vessel to feed vessel.

7. The coal feeder system of claim 1, wherein the feeder device controls the rate of coal feed to the gasifier by maintaining a feeder pressure with gas injection at different locations and by measured flow of control gas through the coal feeder system.

8. The coal feeder system of claim 1, wherein the feeder device further comprises a short vertical, an inclined downcomer and a riser, a feed rate capacity of the downcomer being greater than a desired maximum coal feed rate.

9. The coal feeder system of claim 8, wherein a lower portion of the riser is a moving expanded bed in proportion with an amount of control gas passing there through, a superficial gas velocity in the lower portion of the riser is in the range of about zero to one feet per second.

10. The coal feeder system of claim 8, further comprising an inverted cone configured to convey gas into the riser without substantially disturbing the moving expanded bed.

\* \* \* \* \*